June 20, 1967  D. G. WALLACE  3,325,883
METHOD OF MAKING A PISTON RING ASSEMBLY
Filed Nov. 26, 1962
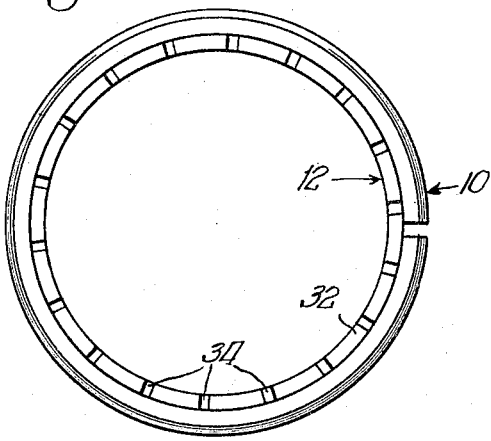
Fig.1
Fig.2
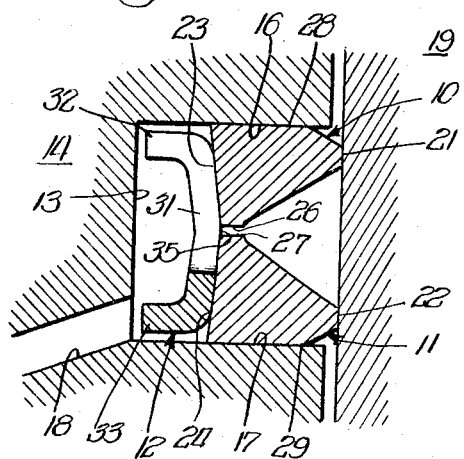
Fig.3
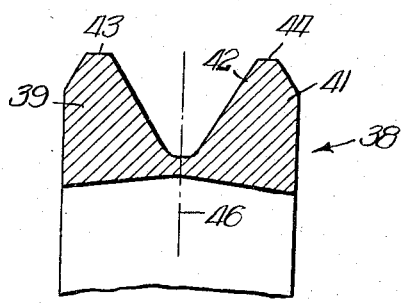
Fig.4
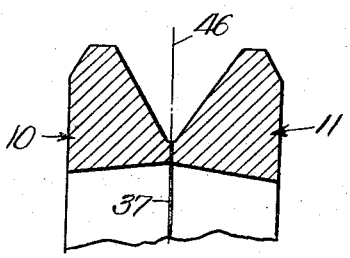
Fig.5
INVENTOR.
Donald G. Wallace,
BY
Hibben, Noyes & Bicknell
Attys.

3,325,883
METHOD OF MAKING A PISTON RING ASSEMBLY
Donald G. Wallace, Hagerstown, Ind., assignor, by mesne assignments, to Dana Corporation, Toledo, Ohio, a corporation of Virginia
Filed Nov. 26, 1962, Ser. No. 240,078
3 Claims. (Cl. 29—156.6)

This invention relates generally to a method of making a piston ring, and more particularly, to a piston ring assembly including two or more oil ring elements, and expanding and positioning means for the elements.

It is an object of this invention to provide a method of making a piston ring assembly of the foregoing character, which is easily installed on a piston.

It is another object of this invention to provide a method of making a piston ring assembly, wherein the expanding and positioning means of the assembly exerts both axial and radial forces on the ring elements.

Still another object is to provide a novel method of constructing an assembly of the foregoing character.

Other objects and advantages of the invention will become apparent from the following description taken in conjunction with the accompanying figures of the drawing, in which:

FIG. 1 is a plan view of a piston ring assembly made in accordance with a method embodying the invention;

FIG. 2 is an enlarged radial sectional view illustrating the assembly in position in a groove within a piston and in a cylinder;

FIG. 3 is a fragmentary perspective view of the assembly before installation on a piston;

FIG. 4 is a radial sectional view of the ring structure of the assembly and showing one step in its manufacture; and FIG. 5 is a view similar to FIG. 4 but showing the ring structure after a further step in its manufacture.

In general, a piston ring assembly embodying the invention is adapted to be installed in an annular piston ring groove formed in a piston and confined within a cylinder of an internal combustion engine, for example.

The assembly comprises a pair of annular ring members and a circumferentially expansible expander for forcing the ring members radially outward into engagement with the cylinder. The ring members are positioned around the expander in axially spaced relation to each other, and the outer periphery of the expander and the inner periphery of each ring member taper axially outward and radially inward on both sides of a radial plane intermediate the ring members. Due to these tapers the expander also exerts an axial force on each ring member, and holds them against the sides of the piston ring groove.

To simplify installation of the assembly on the piston, the ring members are secured to each other as by an adhesive applied to the adjacent sides of the ring members to bond them together. The adhesive is a type which releases the ring members when the engine is operated. After being bonded together, the ring members are positioned around the expander, and the tapered surfaces of the expander and the ring members hold the expander in assembled relation with the bonded ring members during installation, said blank being formed with its inner periphery tapering radially inwardly from both sides of a radial plane intermediate said faces, and said expander having an axially extending portion tapering radially inwardly on both sides of a radial plane intermediate the sides of the expander, and positioning said expander within said ring members with the tapers of the expander engaging the tapers of the ring members to hold the ring members and expander assembled.

The ring members are preferably formed from an annular blank having a pair of axially spaced cylinder engaging faces on its outer periphery and tapered surfaces on its inner periphery. This blank is parted between the faces to form the two ring members.

In greater detail, the assembly (FIGS. 1, 2 and 3) comprises a pair of axially spaced ring members 10 and 11 and an expander 12, positioned within an annular groove 13 formed in a piston 14. The groove 13 (FIG. 2) has upper and lower sides 16 and 17, and a passage 18 is formed in the piston 14 leading from the bottom of the groove 13 adjacent the lower side 17 to the interior of the piston 14 for oil drainage purposes.

The ring members 10 and 11 includes faces 21 and 22, respectively, on their outer peripheries, which are adapted to engage the wall of a cylinder 19 and tapered surfaces 23 and 24, respectively, on their inner peripheries which engage the expander 12. The ring members 10 and 11 also include radial adjacent sides 26 and 27 and radial outer sides 28 and 29, the latter sides 28 and 29 being adapted to engage the upper and lower sides 16 and 17, respectively, of the groove 13.

The expander 12 is a circumferentially expansible type, and comprises an axially extending portion 31 and radially inward extending portions 32 and 33 at the upper and lower sides of the portion 31. The expander 12 is also provided with transverse slots 34, adjacent slots 34 extending axially from opposite sides of the expander 12, and the slots in one side overlapping the slots in the other side. By this construction, the expander 12 is circumferentially expansible, and when formed into a ring with its ends in abutment and confined in the cylinder 19, it will tend to increase its circumferential dimension.

The portion 31 of the expander 12 tapers inwardly on both sides of a radial plane intermediate, and preferably midway between, the radial portions 32 and 33. An apex, indicated by the numeral 35, is thus formed in this radial plane by the tapers. The angle of taper of the portion 31, on each side of the apex 35 is preferably substantially equal to the angle of taper of the surfaces 23 and 24 of the ring members 10 and 11.

When the assembly is installed in the groove 13 and confined within the cylinder 19 with the ends of the expander 12 in abutment, the expander 12 exerts a radially outward force on the ring members 10 and 11. Simultaneously, the tapered surfaces of the expander 12 and the ring members 10 and 11 force the ring members 10 and 11 axially away from each other. The radial and axial forces exerted by the expander 12 hold the faces 21 and 22 against the wall of the cylinder 19 and tend to hold the outer sides 28 and 29 of the ring members 10 and 11 flat against the upper and lower sides 16 and 17 of the piston ring groove.

The ring members 10 and 11 are constructed to provide a V-shaped opening between their outer positions so that cylinder engaging faces 21 and 22 may be spaced a considerable axial distance apart and at the same time the inner surfaces 23 and 24 of the ring members have a relatively large axial dimension. Spacing the faces 21 and 22 apart is advantageous because, during operation of an engine containing the ring assembly, most of the heat generated occurs at these faces and, if carbon is formed around the faces 21 and 22, the large space between the faces avoids chance of clogging due to carbon. At the bottom of the V-shaped opening where the ring members 10 and 11 are close together, the ring members are relatively cool so that there is less chance of carbon forming. Further, during operation of the engine, some relative movement of the two ring members may occur which movement prevents any carbon from forming. The ring members may move axially and circumferentially relative to each other, or they may twist slightly. Substantial twisting of the ring members 10 and 11 is prevented, however, by the previously mentioned relatively large axial dimension of the inner surfaces 23 and 24 of the ring members 10 and 11.

While the axial space between the two ring members 10 and 11 may be relatively small, of the order of .005 inch, it is sufficiently wide to permit the flow of oil scraped off the cylinder wall to the bottom of the groove 13. However, one or both of the ring members 10 and 11 may be slotted if desired for increased oil drainage. Further, the ring members 10 and 11 may be chrome plated on the faces 21 and 22. By sloping the sides of each ring member 10 and 11 adjacent the faces 21 and 22, the faces are adequately supported and better chrome plating is obtained.

To simplify installation of the piston ring assembly on the piston 14, prior to installation the ring members 10 and 11 are secured to each other as by being bonded together with an adhesive, indicated generally by the numeral 37. The adhesive 37 is preferably of a type which dissolves upon operation of the engine containing the piston 14 and the cylinder 19. For example, it may be oil soluble. After the ring members 10 and 11 are bonded together they are positioned around the expander 12 with the juncture of the two ring members 10 and 11 overlying the apex 35, the expander 12 having been bent to form a circle. In this position, the tapered surfaces of the ring members 10 and 11 and the expander 12 hold the assembly together because of the outward force exerted by the expander. After operation of the engine, the adhesive 37 dissolves and the expander 12 then forces the ring members 10 and 11 to the positions shown in FIG. 2.

In a preferred method of making the ring members 10 and 11, an annular blank indicated by the numeral 38 (FIG. 4) is formed of a material such as cast iron. The blank 38 is formed with a pair of axially spaced radially extending flanges 39 and 41 separated by an annular groove 42. Faces 43 and 44 are formed on the outer peripheries of the flanges 39 and 41, and the inner periphery of the blank 38 tapers inwardly on both sides of a radial plane, indicated by the numeral 46, passing through the bottom of the groove 42.

The blank 38 is cut or parted along the radial plane 46 thereby forming the ring members 10 and 11 and the faces 43 and 44 of the blank forming the cylinder engaging faces 21 and 22 of the ring members 10 and 11. In FIG. 5, the ring members 10 and 11 are shown bonded together and before they are positioned around the expander 12.

The piston ring assembly has numerous advantages in addition to those previously described. Due to the tapered surfaces of the ring members 10 and 11 and the expander 12, radial and axial forces are simultaneously exerted on the ring members. Further, the assembly is easily installed in an engine because the adhesive and the tapers of the members holds the parts in properly assembled relation.

Still further, the ring members may be readily manufactured by forming a single blank and then dividing it.

I claim:
1. A method of constructing a piston ring assembly, comprising forming a generally annular blank having a pair of axially spaced cylinder engaging faces on its outer periphery, parting said structure along a radial plane intermediate said faces to form a pair of ring members, bonding said ring members together, and positioning said ring members around a circumferentially expansible expander with the expander bearing against the inner peripheries of said ring members.

2. A method as in claim 1, wherein said ring members are bonded together with an oil soluble adhesive, and further including the steps of installing said assembly in an annular groove formed in a piston of an internal combustion engine, and operating said engine, whereby oil of the engine dissolves said adhesive and releases said ring members, which then move axially of the piston against the sides of said groove under the action of said expander.

3. A method of constructing a piston ring assembly for an engine, comprising forming a pair of annular ring members each having a cylinder engaging face on its outer periphery and a taper on its inner periphery, the tapers on the two ring members being in opposite directions, bonding said pair of ring members together with an adhesive soluble upon operation of the engine with said faces in axially spaced relation and said tapers of said inner peripheries forming an annular recess, forming a spacer-expander having a tapered outer surface which mates with said recess formed by said ring members, and positioning said ring members around said spacer-expander with said outer surface of said spacer expander within said recess of said ring members, said mating tapers holding said ring members and said spacer-expander in assembled relation.

References Cited

UNITED STATES PATENTS

| | | |
|---|---|---|
| 2,140,710 | 12/1938 | Meisel. |
| 2,148,997 | 2/1939 | Philips. |
| 2,154,342 | 4/1939 | Marvin. |
| 2,311,783 | 2/1943 | Siegling _____ 29—156.6 |
| 2,346,898 | 4/1944 | Bowers _____ 29—156.6 |
| 2,406,844 | 9/1946 | Marien et al. _____ 29—156.6 X |
| 2,695,825 | 11/1954 | Estey _____ 277—141 |
| 2,854,301 | 9/1958 | Lutz _____ 29—156.6 X |
| 2,988,409 | 6/1961 | Fuhrmann _____ 277—141 |

FOREIGN PATENTS 543,369   7/1957   Canada.

JOHN F. CAMPBELL, *Primary Examiner.*

WHITMORE A. WILTZ, *Examiner.*

J. C. HOLMAN, P. M. COHEN, *Assistant Examiners.*

UNITED STATES PATENT OFFICE
CERTIFICATE OF CORRECTION

Patent No. 3,325,883                          June 20, 1967

Donald G. Wallace

It is hereby certified that error appears in the above numbered patent requiring correction and that the said Letters Patent should read as corrected below.

Column 1, line 64, beginning with ", said blank" strike out all to and including "expander assembled" in line 72, same column 1, and insert the same after "members" in line 12, column 4.

Signed and sealed this 22nd day of October 1968.

(SEAL)
Attest:

Edward M. Fletcher, Jr.                          EDWARD J. BRENNER
Attesting Officer                                Commissioner of Patents